June 30, 1942.  T. J. STEPHENS  2,288,045
PROCESS FOR ROASTING COCOA BEANS
Filed Oct. 1, 1938    11 Sheets-Sheet 2

INVENTOR
THOMAS J. STEPHENS
BY
his ATTORNEY.

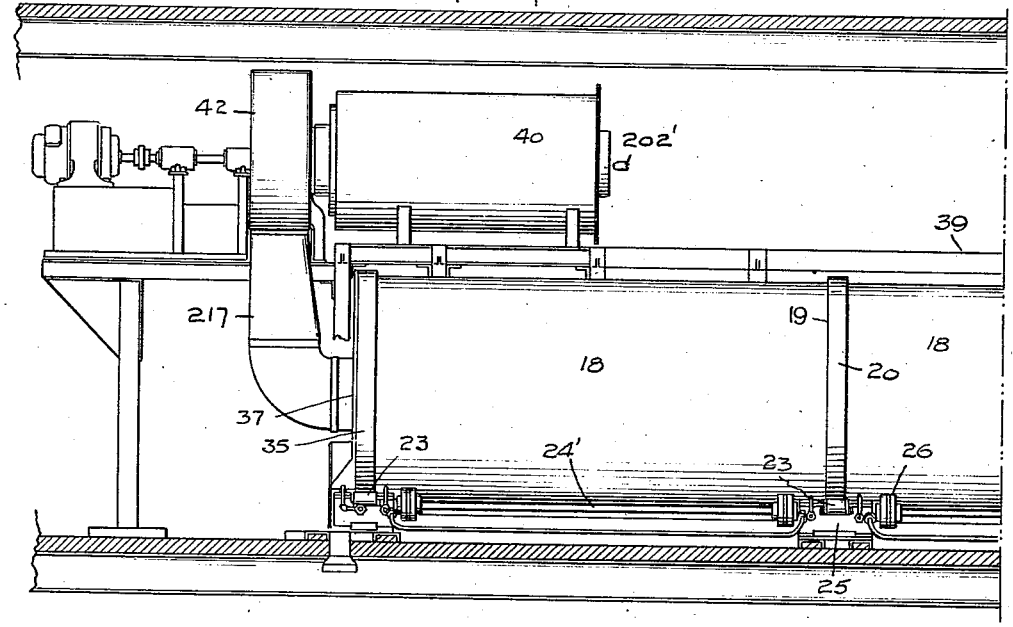
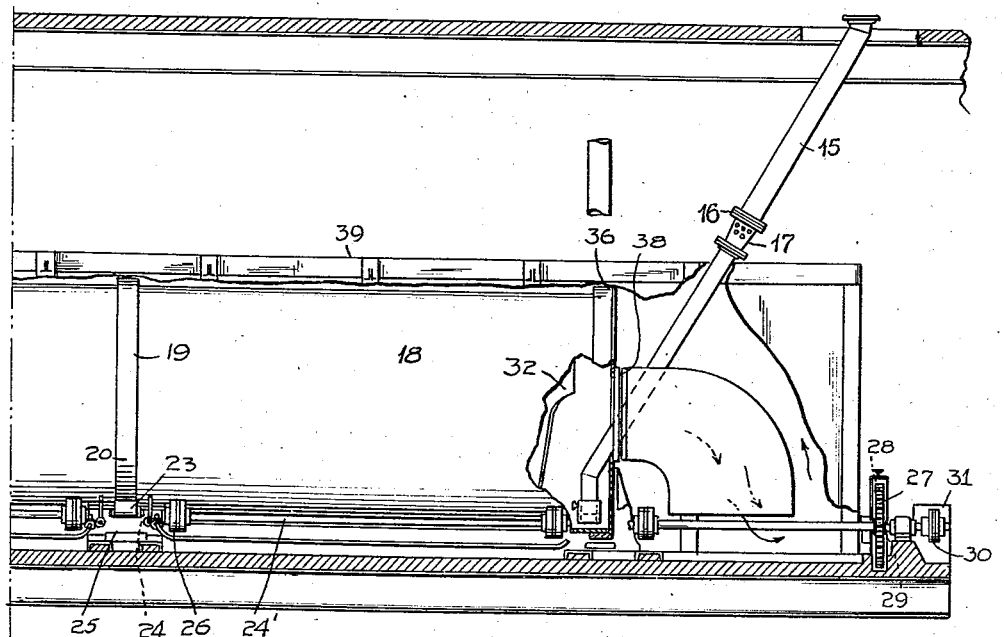

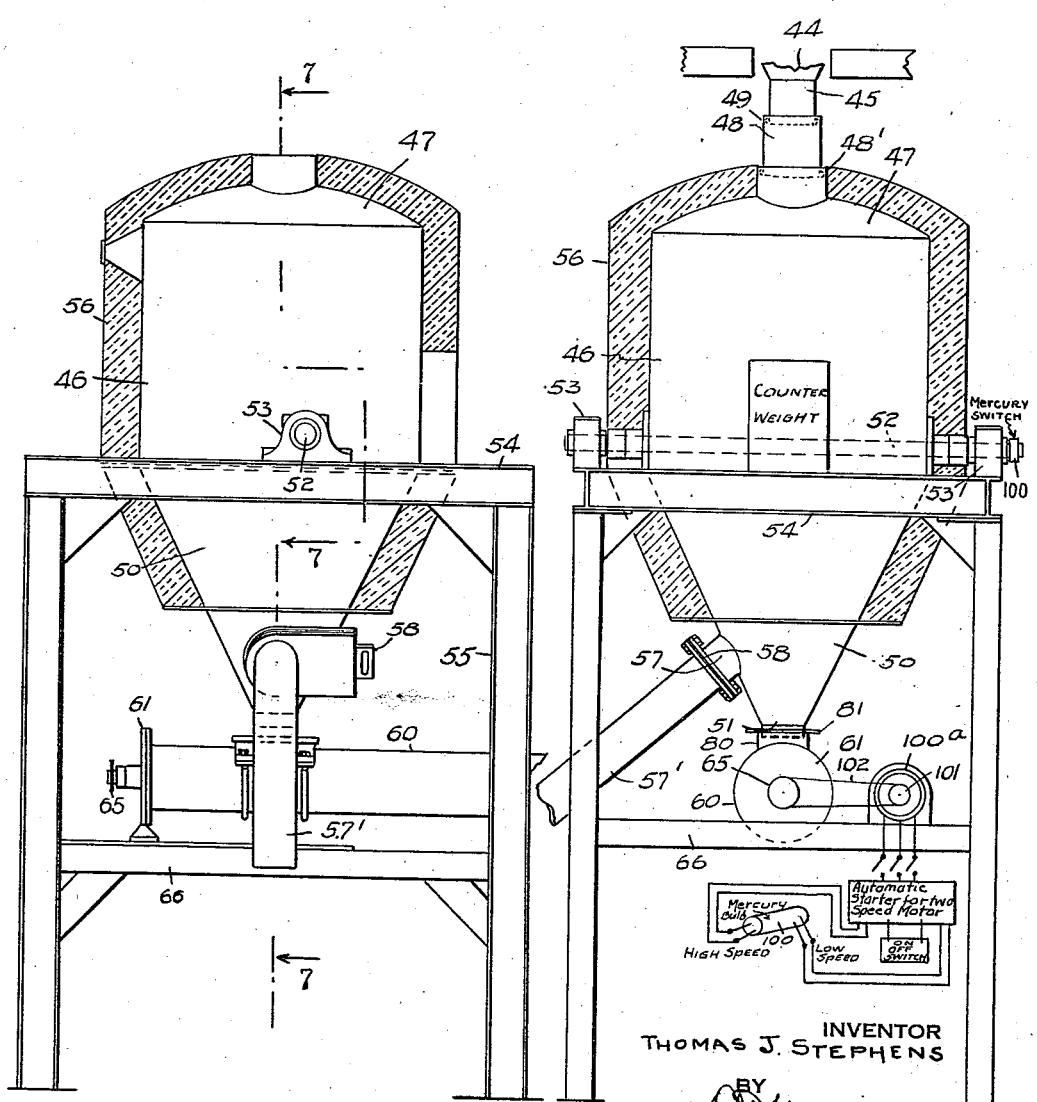

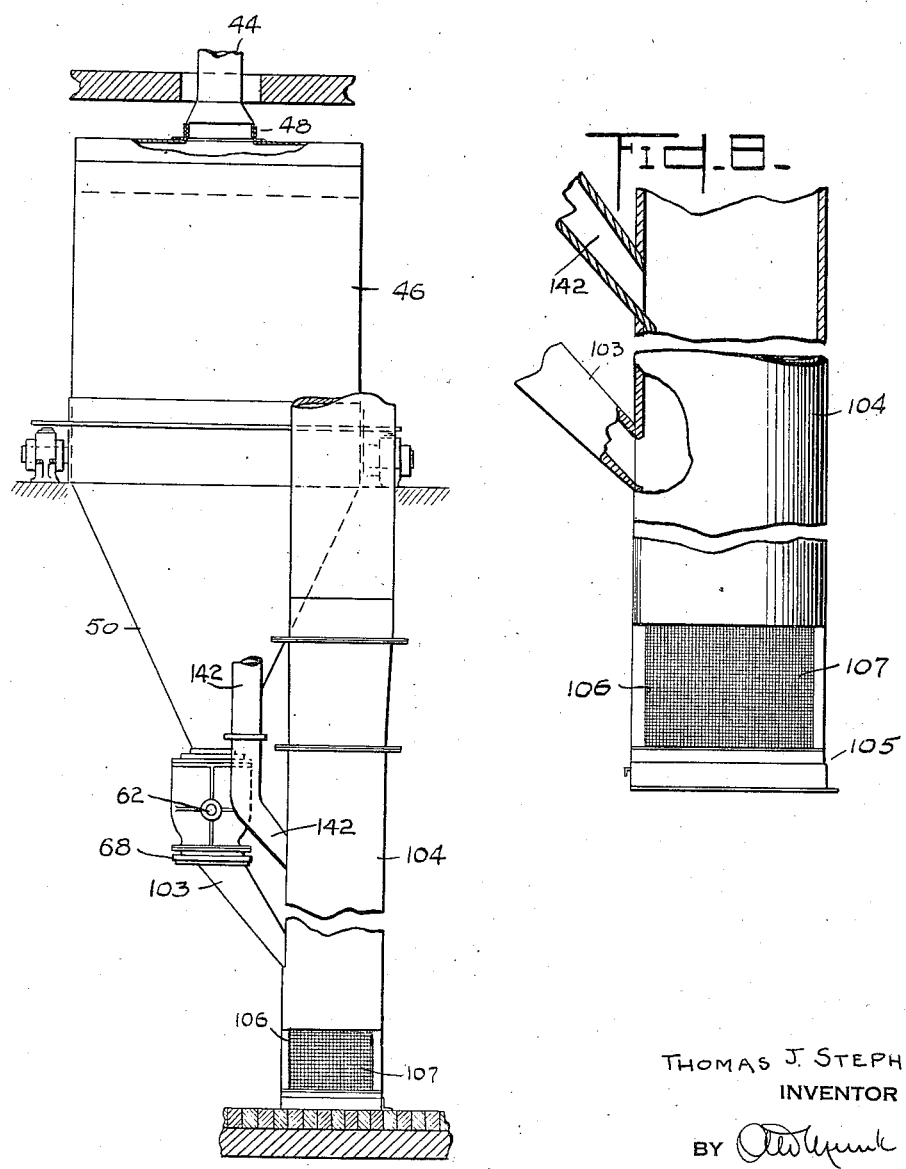

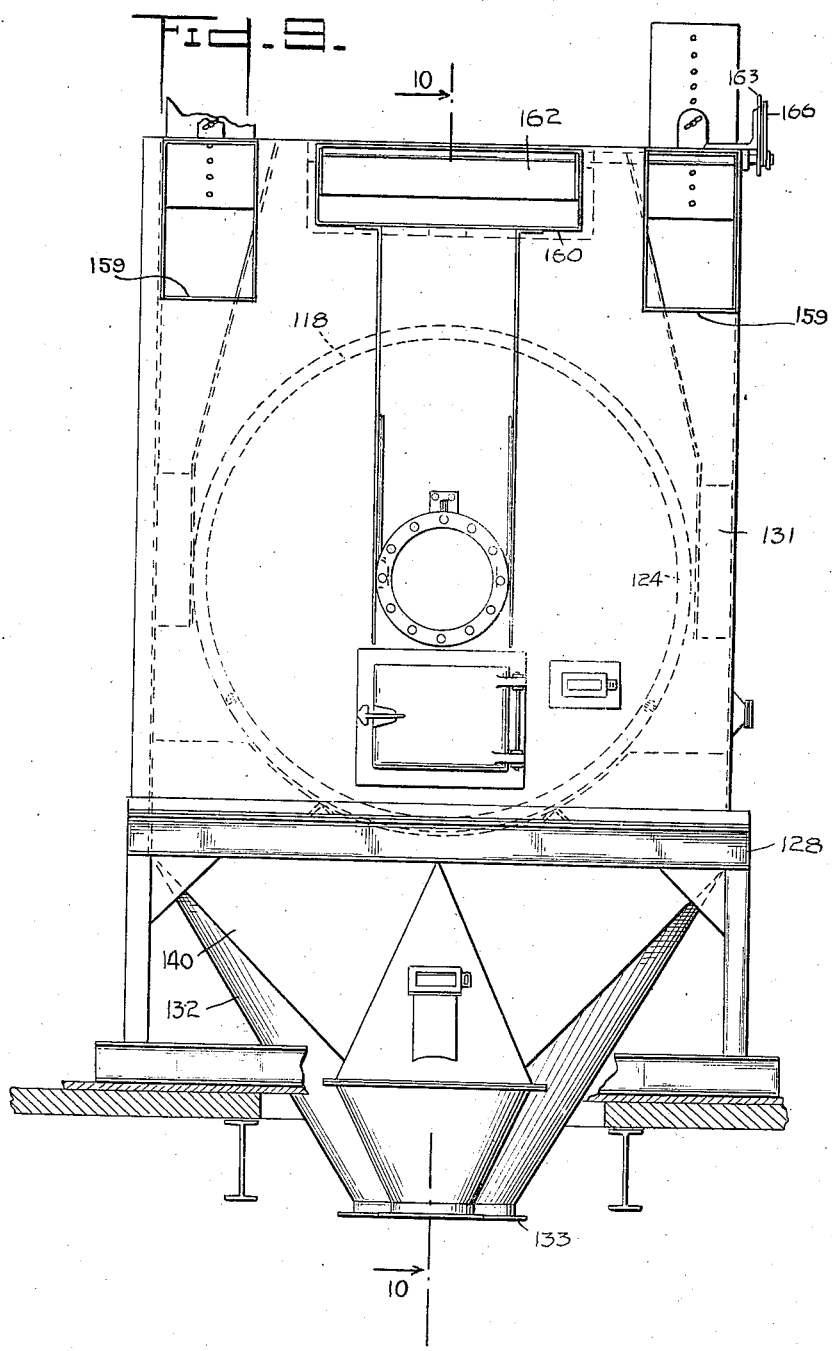

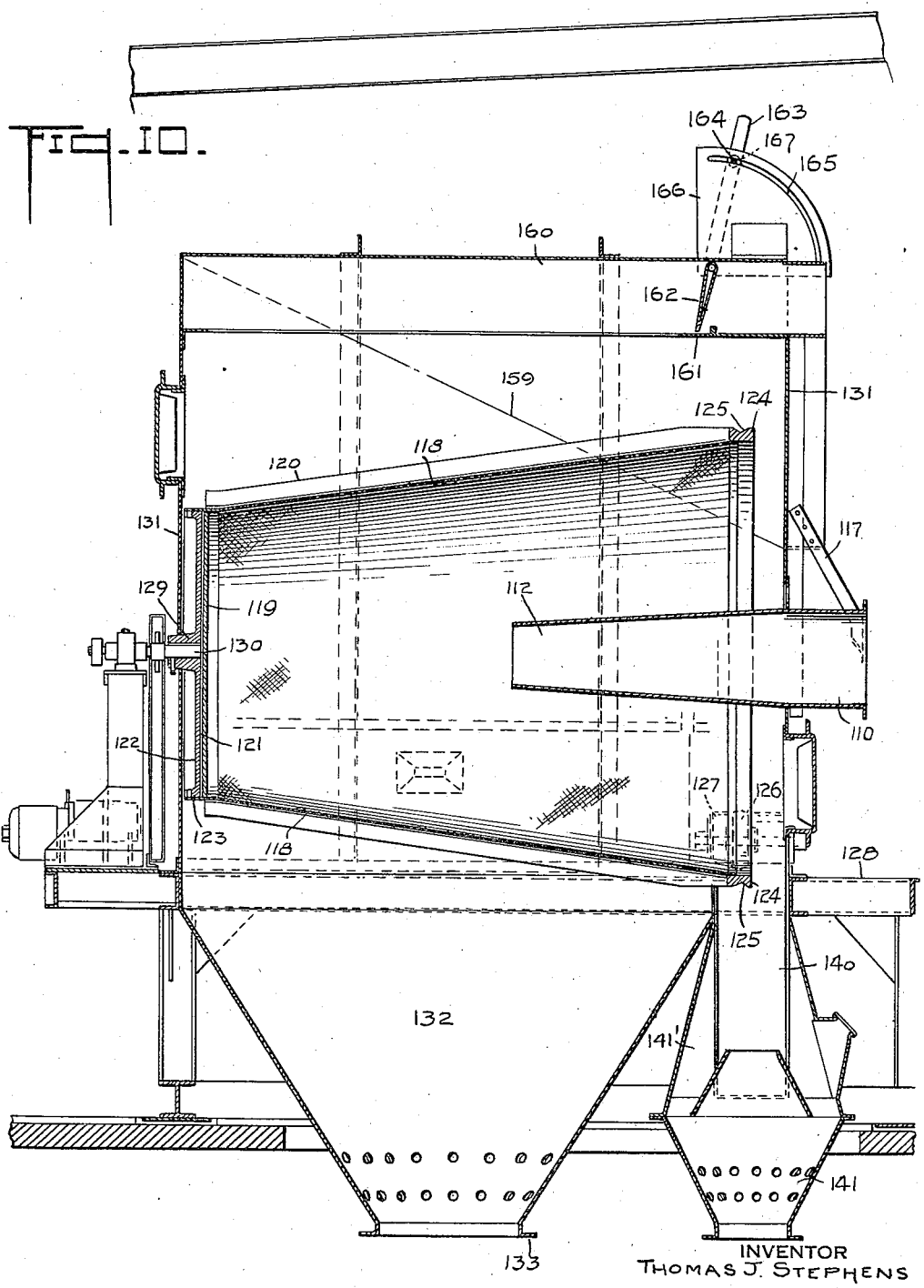

June 30, 1942.　　T. J. STEPHENS　　2,288,045
PROCESS FOR ROASTING COCOA BEANS
Filed Oct. 1, 1938　　11 Sheets-Sheet 8
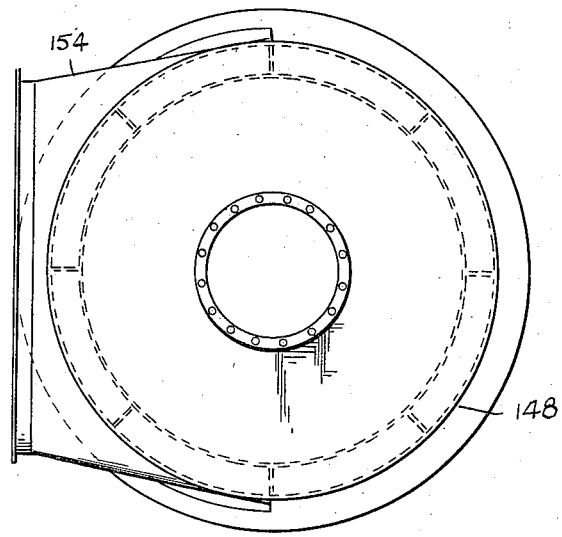
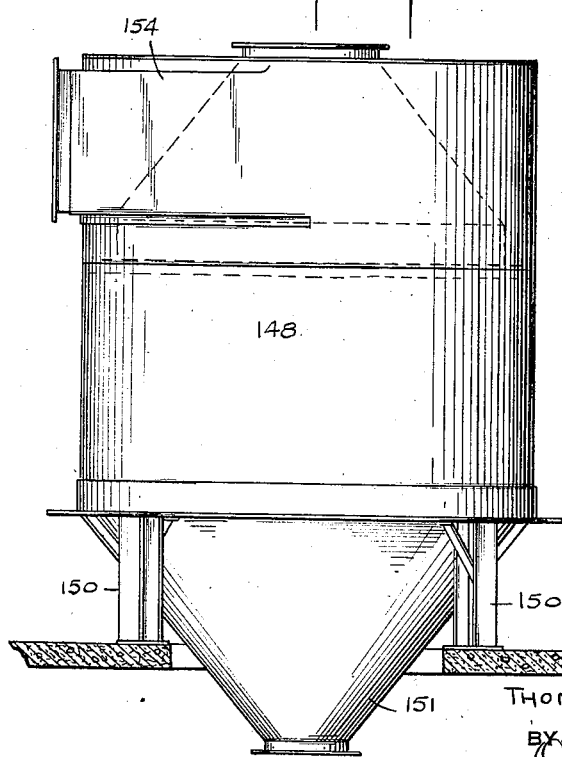
INVENTOR
THOMAS J. STEPHENS
BY
his ATTORNEY

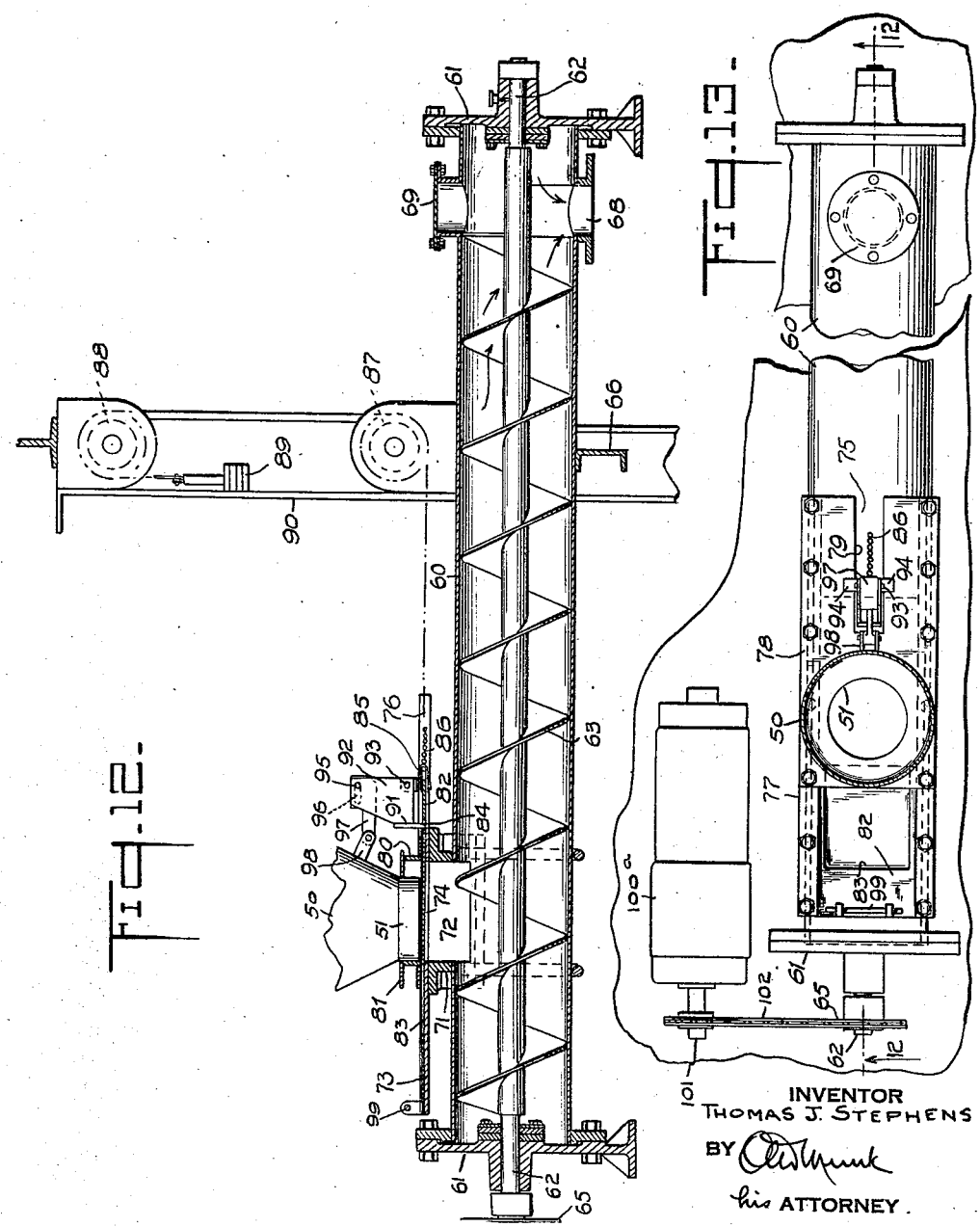

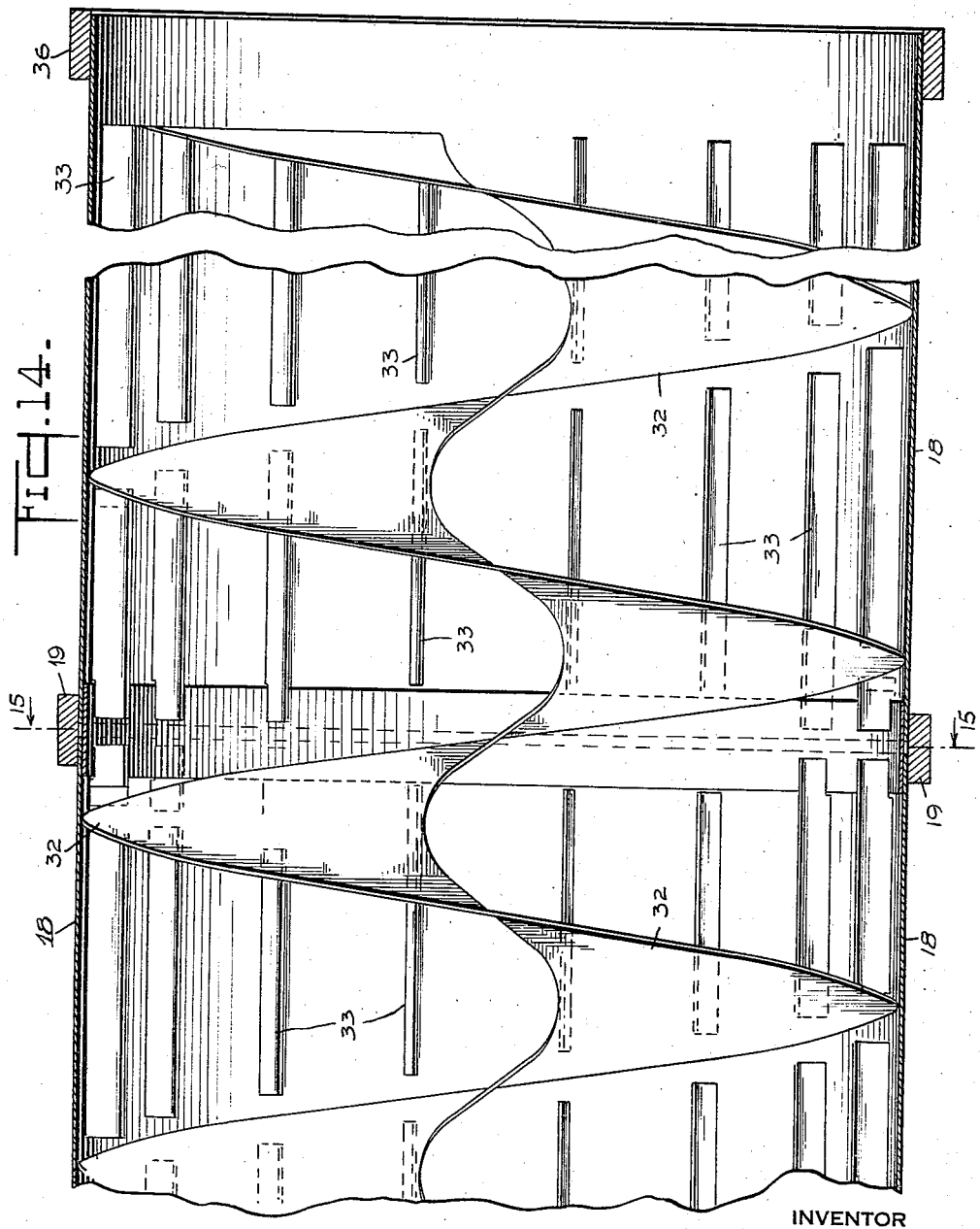

June 30, 1942.  T. J. STEPHENS  2,288,045
PROCESS FOR ROASTING COCOA BEANS
Filed Oct. 1, 1938   11 Sheets-Sheet 11
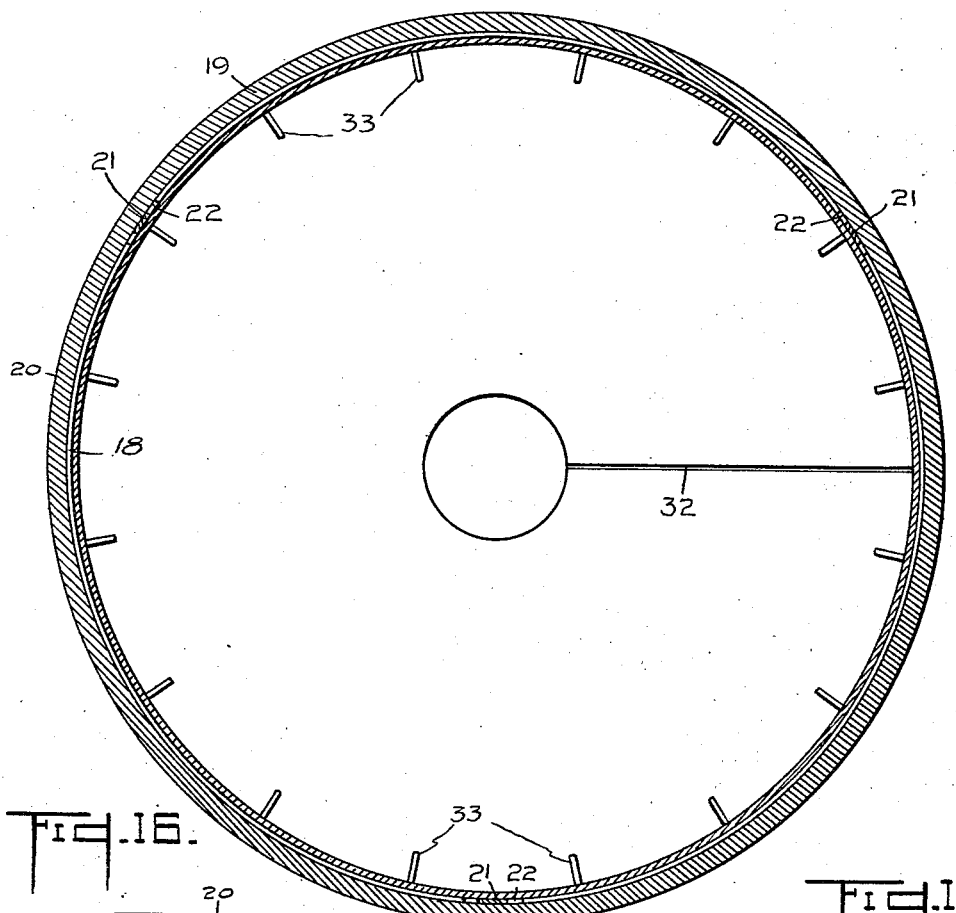
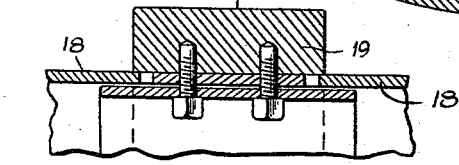
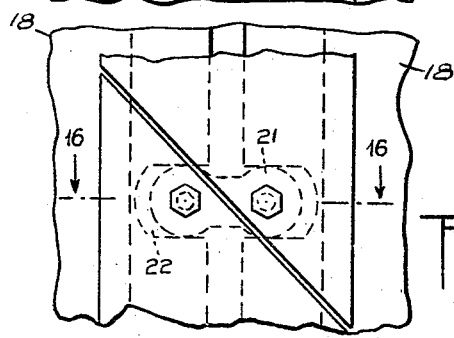
INVENTOR
THOMAS J. STEPHENS
BY
his ATTORNEY.

Patented June 30, 1942

2,288,045

UNITED STATES PATENT OFFICE 2,288,045

PROCESS FOR ROASTING COCOA BEANS

Thomas J. Stephens, New York, N. Y.

Application October 1, 1938, Serial No. 232,746

14 Claims. (Cl. 99—23)

This invention relates to the preparation of food products from raw materials which are ordinarily roasted prior to their ultimate preparation for consumption and the invention has reference particularly to an improved process of and apparatus for roasting, breaking, cooling, screening and winnowing the materials to be treated.

The operation embraced by the present process and carried out in practice in my improved apparatus is directed particularly to the treatment of cocoa beans, which in their raw state are unpalatable, unwholesome and have practically no food value, and in which aroma, flavor and food value are developed entirely by causing chemical changes to occur in the constituents of the beans when subjected to the influence of heat. These changes are induced and promoted in the constituents of each cocoa bean solely by the temperature of such constituents, and the degree to which the changes are advanced towards completion depends upon the time interval during which the constituents are maintained at the temperature which promotes the change.

Briefly, the fats (cocoa butter) contained in the cocoa beans, comprise not less than fifty percent of the weight of the roasted cocoa beans. These fats are extremely delicate materials in the sense that they contain the essential oils which supply the aroma and flavor in chocolate and cocoa. Consequently if during the roasting process any portion of the cocoa bean is unduly heated, the essential oils volatilize and are lost from that portion and the remaining fats become less palatable and less digestible and therefore less salable.

After exhaustive research, it has been discovered that the maximum of flavor, aroma and food value is induced and promoted in the beans by temperatures well below 275 degrees Fahrenheit, which allows the beans to retain their maximum of essential oils and fats.

The thermal conductivity of the cocoa bean is extremely low and in order to raise the temperature of the inner constituents of the bean, heat must be transferred through the outer constituents by induction. When, therefore, heat is applied to the bean at excessive temperature throughout a given roasting period to develop the essential oils and food value in the central constituents, the surface constituents become overheated and damaged. Since the outer or surface constituents of the cocoa bean are richer in the essential elements than those found inside any surface damage to the bean caused by excessive temperature will be accentuated in the derivative product.

It is therefore an object of the present invention to provide a process as well as equipment for carrying out the process for treating the raw material, such as cocoa beans, to raise by the gradual infusion of heat therein, the temperature of the beans to that degree only which induces and promotes the chemical changes resulting in the development of the highest quality of aroma, flavor and food value of which the roasted bean is capable, and to uniformly maintain, not only all of the individual beans, but also all of the constituents of each bean from the surface to the center at the desired temperature for an adequate time interval during which the chemical changes can mature to uniform completion throughout the bean structure.

A further object of my invention is to provide a process and an equipment by means of which large scale commercial operations in the heat treatment of cocoa beans and other materials may be practiced without in any way sacrificing quality to quantity production.

A still further object of the invention is to provide a process and apparatus for the purpose of reducing the cost of production of food products from raw materials to a minimum, while at the same time uniformly increasing their quality.

I accomplish these objects by means of the embodiment of my invention hereinafter described, set forth in the appended claims and illustratively exemplified in the accompanying drawings, in which:

Figure 4:
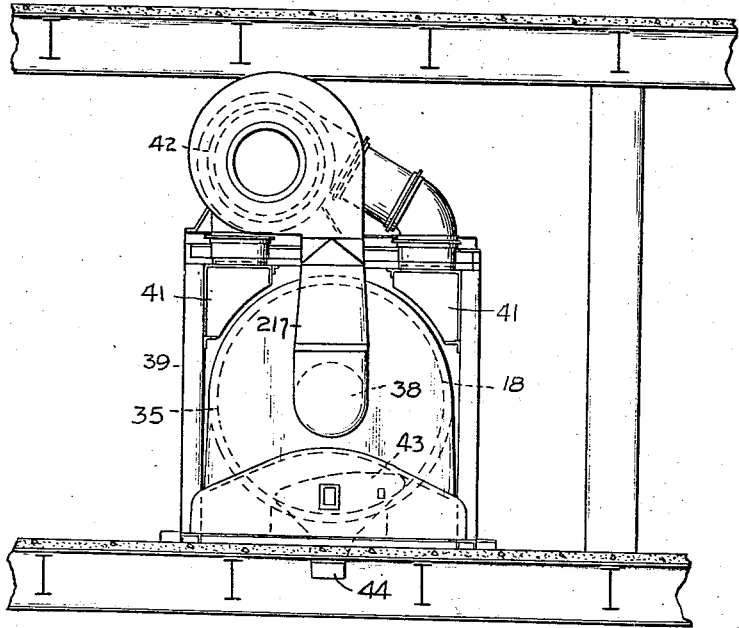

Figures 3 and 3A comprise a side elevational view of the roaster showing parts of the walls thereof broken away to disclose otherwise hidden parts;

Figure 4 is an elevational view of the delivery end of the roaster and associated parts;

Figure 5 is an elevational view of the curing chamber at the delivery end of the roaster;

Figure 6 is a substantially longitudinal sectional view of the curing chamber and feed controlling apparatus therefor, taken on lines 6—6 of Figure 5;

Figure 7 is an elevational view of the curing chamber, conveyor and the elevator leading to the breaking chamber; and Figure 8 is an enlarged sectional view of the lower screen end of the elevator;

Figure 9 is an end elevational view of the breaking chamber;

Figure 10 is a substantially longitudinal sectional view of the breaking chamber, taken on lines 10—10 of Figure 9;

Figure 11 is an elevational view of the condenser showing parts broken away; and Figure 11A is a top plan view of the condenser;

Figure 12 is a substantially longitudinal sectional view of the conveyor at the delivery end of the curing chamber taken on lines 12—12 of Figure 13;

Figure 13 is a top plan view of the conveyor housing and slide valve for curing chamber;

Figure 14 is a substantially longitudinal sectional view of a shell and helical partition forming a section of the rotary cylindrical roaster;

Figure 15 is a substantially transverse section of the roasting cylinder section taken on lines 15—15 of Figure 14;

Figure 16 is a section taken on lines 16—16 of Figure 17 of the joint between adjacent cylindrical section;

Figure 17 is an inside view of the parts shown in Figure 16;

Figure 18 is an elevational view of the joint between the adjacent cylinders with the inner ring removed;

Storage bin

Figure 1:
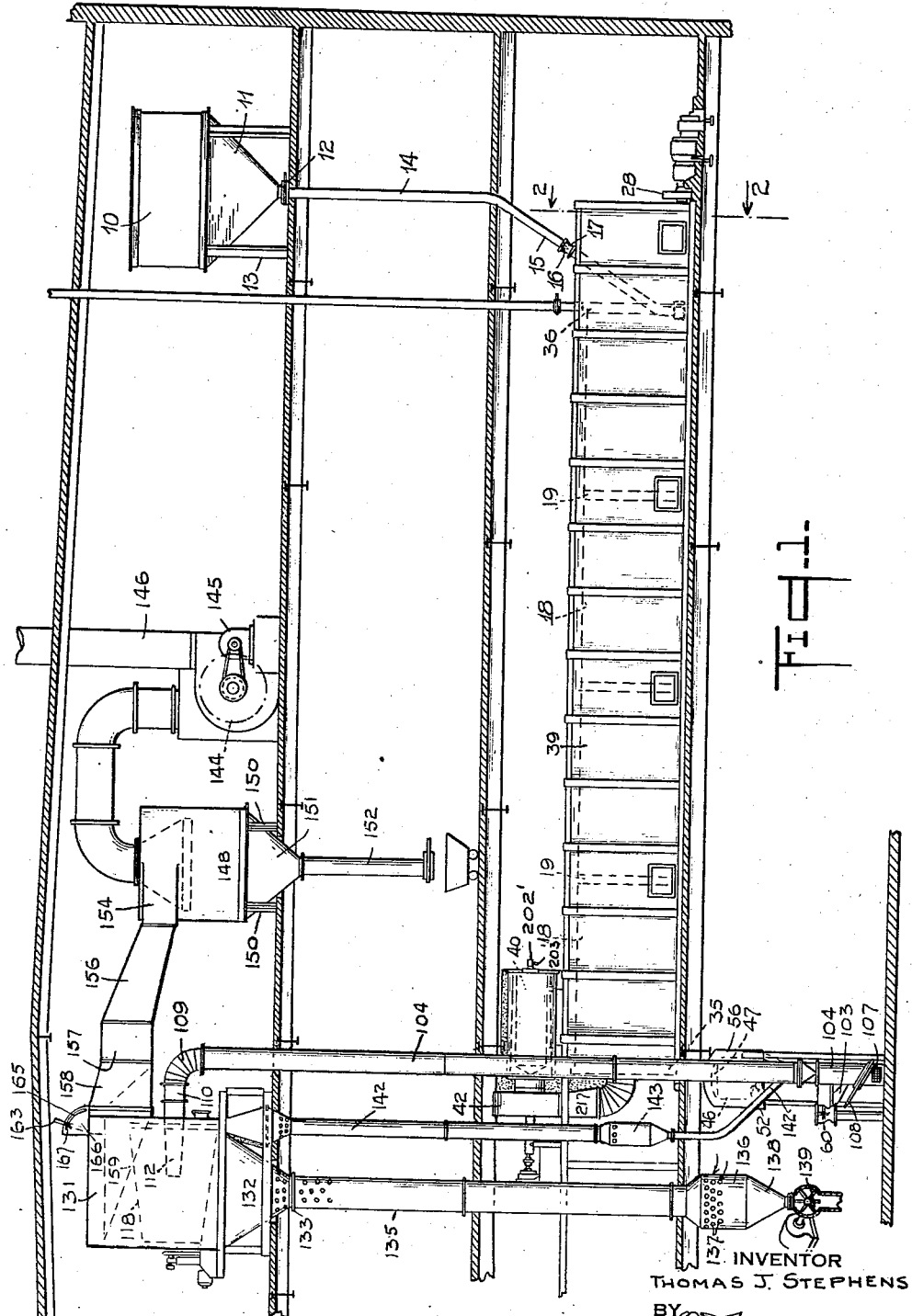
Figure 1 is a substantially longitudinal sectional view of a building in which my improved roaster and associated apparatus have been set up.

Referring to the drawings, and particularly Figure 1, 10 denotes a storage bin, which is located on an upper floor of a building, and from which the raw cocoa beans feed to the roaster. The storage bin 10 comprises a container having a cylindrical upper portion and funnel-shaped lower section 11. The lower end of the funnel 11 is provided with an outlet port 12, the latter being disposed at approximately the level of the floor. The entire storage bin 10 is suitably supported upon the supports of a super-structure 13.

The port 12 is flanged and forms a connection for a downwardly projecting tube 14, which drops through the two upper floors of the building and which carries an angular extension 15 at its lower end to bring its discharge end within the roasting unit. The extension 15 is provided with a valve 16 located at any point convenient in its length and a slightly tapered perforated union 17 just below the valve 16, the extreme lower portion of the extension being of a smaller gauge tubing than the portion thereof from the valve upwardly to the storage bin 10 to facilitate flow through the pipe, the perforations permitting observation of the rate of flow of the beans.

Roaster

Figure 2:
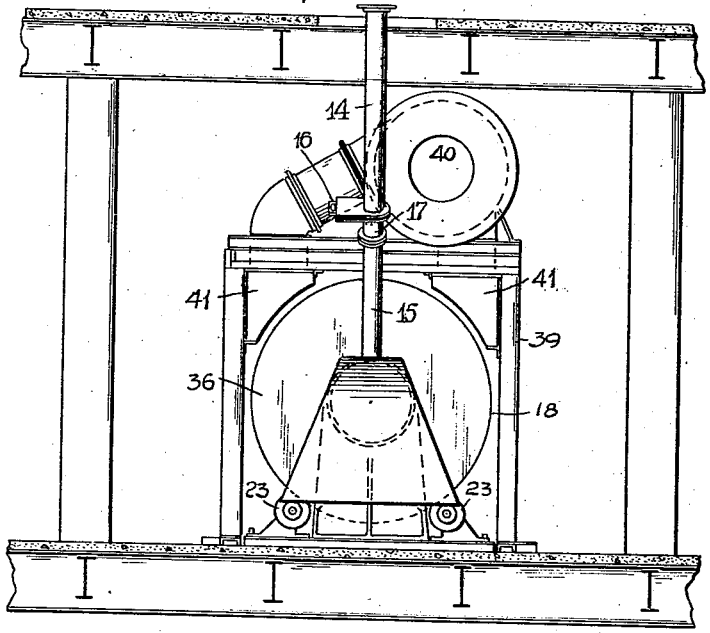
Figure 2 is a substantially transverse sectional view of the roaster taken on lines 2—2 of Figure 1.

The delivery end of the extension 15, Figures 2 and 3A, enters the intake end of the roasting unit, which in the present embodiment comprises a horizontally disposed cylindrical shell 18 of approximately six feet in diameter and fifty feet in length. The cylindrical shell 18, see Figures 14 and 15, may be made up of a plurality of axially aligned longitudinally disposed sections, the adjacent ends of adjoining sections being spaced apart approximately one inch. Embracing the adjacent ends of the sections as well as the extreme ends of the end sections of the shell 18 are steel hoops or rings 19, the outer periphery thereof being shaped to form circular tracks 20. The inner wall of each ring 19 is provided with three equally spaced lugs 21 which are engaged in correspondingly arranged recesses 22 in the ends of the sections, whereby the latter and the rings 19 are fixed as regards their circumferential relation to each other.

The cylindrical shell 18 is rotatably mounted on two appropriately spaced parallel shaft and trunnion assemblies 23 mounted on the floor of the room which accommodates the roasting unit. In accordance with the present construction the ends of the sections of the shell 18 are each cradled in the track rings 19, thus the midportions of the sections are suspended and as a result self-alignment of the fifty-foot cylinder 18 is assured as well as is an equal distribution of its weight upon the trunnions. The trunnions 23 are aligned and so disposed as to support the weight of the track rings 19 together with the added weight of the cylinder 18.

Each trunnion 23 is provided with a shaft 24 journalled in bearings 25, preferably of the water cooled type, and coupled to the adjoining shaft 24' by means of couplings 26, the couplings being of the universal movement type and adapted to provide driving means for rotating the cylindrical shell 18 through friction exerted upon the trunnions by the weight of the track rings 19 and cylinder, which weight is equalized upon the trunnions because of the self-alignment feature provided between the track rings and the cylinder ends.

The end shaft assemblies 24 are each provided at the drive end of the cylinder, see Figures 2 and 3A, with a spur gear 27 which is engaged with an intermediate drive gear 28. The gear 28 is mounted on a drive shaft 29 of a prime mover 30, the shafts 24 and gears 27 and 28 are suitably housed in a housing 31.

Referring now to Figures 1 to 5 and 14 and 15 it will be seen that each cylindrical section of the shell 18 is provided with an internally disposed helical partition 32, which projects from end to end, and which at the ends is so disposed as to adjoin the adjacent ends of adjacent helical partitions 32 so as to produce one continuous helical partition running throughout the entire length of the assembled fifty foot shell 18.

The helical partition 32 in the embodiment illustrated in Figure 14 shows the partition 32 to be almost as great in width as that of the radius of the cylindrical shell 18 and in this construction flights 33 are mounted on the inner wall of the shell at spaced intervals within the helical path formed by the convolutions of the helical partition 32. The flights 33 are provided to prevent slippage and further to cause rolling of the masses of beans in their transit through the shell 18 when the latter is in rotary motion.

Opposite ends of the cylindrical shell 18 are provided with closures 35 and 36, the former having a heat inlet port 37 and the latter a heat outlet port 38. The port 38 also serves to admit the feeding tube to the interior of the cylinder.

The entire shell 18 is appropriately enclosed in a housing 39 which is constructed of insulating materials adapted to provide a maximum of heat conservation in the roasting unit.

As previously described the lower end of the extension tube 15 projects into the roasting unit and in the present construction the tube 15 passes through the housing 39 and into the cylindrical shell 18 through the heat outlet port 38, the discharge nozzle or end of the tube 15 being so constructed and fitted to the tube as to permit the nipple or shoe at the end thereof being raised or lowered to provide the necessary space between the same and the lower portion or wall of the cylindrical shell 18.

Heat generating unit

A heat generating unit, see Figures 1 and 4, is mounted on the delivery end of the housing 39 and delivers into the shell 18, through the inlet port 37, a highly efficient gaseous heat vehicle. The heater unit comprises a combustion chamber 40 provided with adjacent flow ways 41, which comprise triangular conduits arranged throughout the length of the housing 39 and interiorly thereof at the upper corners, and through which the desired quota of the heat vehicle may be recirculated from the exhaust end or port 38 of the shell 18 for regenerating temperature in said vehicle. The heater unit is provided with a fan 42 for actuating the flow of the gaseous heat vehicle from the heating unit 40 through the entire length of the cylindrical shell 18 and for returning a quota of the vehicle through conduits 41 to the heating unit for regeneration of its temperature. An example of heating unit which may be used in the present installation is described in my copending application for Letters Patent filed Oct. 6, 1936, Ser. No. 104,275.

Curing chamber and conveyor

The material roasted in the cylindrical shell 18 is being continuously discharged from the latter through a port 43 located with its lower side below the interior surface of the cylinder wall at its lowest point, as illustrated in Figure 4. The port 43 opens into a closed chute 44, the lower end of which projects through the floor supporting the roaster unit and terminates in a depending tapered nozzle portion 45.

In Figures 5 and 6 I have illustrated the curing chamber in detail. The curing chamber comprises an upright cylindrical container 46, having a dome-shaped top wall 47 provided with an axially projecting sectional and flexible intake neck 48, the latter being adapted to accommodate the depending nozzle 45 of the discharge chute 44. The curing chamber swings about a transverse axis, as hereinafter described and as a consequence it is necessary to provide play between the nozzle 45 and neck 48. The play between these parts is taken care of in any position of the chamber and its neck 48 by means of a pivotal connection 49 for the nozzle 45 and upper section of the neck 48, the pivotal connection being parallel with the turning axis of the chamber. The upper section of the neck 48 carries an exterior gasket at its lower end which slidably contacts the inner wall of the lower neck section to form a sliding tight joint similar to a ball joint.

The lower portion of the chamber comprises an inwardly and downwardly tapered section 50 terminating at its lower end in a depending collar 51 forming an outlet. The entire curing chamber is mounted to permit rocking thereof about a transverse axis disposed to one side of a line drawn through a diameter of the cylindrical container 46. The support for the container comprises oppositely disposed coaxial bearing shafts 52 mounted in bearings 53, which are carried on the cross beams 54 of a superstructure 55, and which allow the curing chamber to swing within limits about its rocking axis in a manner and for a purpose hereinafter described in detail.

The container 46, its dome portion 47 and tapered lower section 50 are protected by an external layer of insulating material 56.

Adjacent the lower end of the tapered section 50, the wall thereof is provided with a downwardly and outwardly directed flanged pipe section 57. A slide valve fitting 58 is supported on the flange to which a valved tubular spout section 57' is attached.

As illustrated particularly in Figures 5 and 12, the materials discharged from the curing chamber through the collar 51 pass into a conveying device. However, the flow of material from the curing chamber must be governed in order to maintain a constant quantity of material therein and this is accomplished initially by a valve mechanism operated by the chamber during movement thereof about its swinging axis or shafts 52.

Figures 12 and 13 are illustrations of the valve mechanism and conveyor which comprise a laterally disposed cylindrical casing 60 projecting at right angles to the axis of the curing chamber, and being closed at opposite ends by bearing plates 61. The plates support opposite ends of a conveyor shaft 62, which carries a helical conveyor blade 63, and which is provided with a sprocket wheel 65 at one of the ends projecting beyond the bearing plate 61. The casing 60 may be supported on a cross beam 66 of the superstructure 55 so as to bring it directly beneath the collar 51 of the curing chamber at a point adjacent the outer end of the conveyor section 63. The pitch of the blades 63 is disposed to convey material towards the opposite end of the casing 60. The discharge end of the blade 63 is disposed just short of a flanged outlet port fitting 68 depending from the underside of the casing 60. An observation hole fitting 69 is arranged perpendicularly of the casing 60 directly over the outlet fitting 68.

Returning now to the opposite end of the casing 60 and the valve construction, see Figures 11 and 12, the latter comprises a flanged perpendicular tubular fitting 71, which rests upon the upper surface of the casing and has its bore 72 oblong in shape, the major axis thereof being disposed axially of the axis of the conveyor shaft 62 and directly transverse of the turning axis of the curing chamber. Supported laterally on the flange fitting 71 is a guide plate 73, having an oblong opening 74 registering with the bore 72, and being provided with a slot 75 at one end. Transversely spaced side bars 77 with opposed grooves 76 are mounted on the guide plate 73 and mounted on the bars 77 is a cover plate 78 having a slot 79, disposed over the slot 75 in the underplate 73, and an upright oblong neck portion 80. The collar 51 of the curing chamber projects into the neck 80 and is capable of being moved through an arc along the major axis of the latter as the curing chamber rocks about its turning axis. The collar 51 carries a lateral flange 81 on a plane just above the open end of the neck 80 so as to close the space not being occupied by the collar 51.

Arranged in the grooves 76 is a valve plate 82 which comprises a rectangular member having a rectangular opening 83 adjacent the end forward of the neck 80, the mid-portion of the plate 82 adjacent its opposite end being provided with a small opening 84. The normal tendency of the plate 82 is to move to a position which brings the opening 83 into full register with the oblong opening 74 of the guide plate 73, and this movement is effected by means of a link 85 engaging one end of a chain 86 and being attached to the inner end of the valve plate 82. The chain 86 extends in the direction of movement of the conveyor 63 to a pulley 87 about which it turns to a perpendicular line to a second overhead pulley 88, the chain turning about the second pulley and depending therefrom to receive a weight 89. The pulleys 87 and 88 are loosely mounted on bearing pins 90 supported in an upright member 90 of the superstructure 55.

The valve plate is locked in the closed position, illustratively exemplified in Figures 12 and 13, by means of a latch 91 engaged in the small opening 84. The bolt 91 is carried in depending position at the forward end of yoke 92, which is arranged in upright position and pivotally mounted at its end opposite its latch 91 on a pin 93. The pin 93 spans the slots 75—79 and is supported in ear pieces 94 carried by the upper plate 78, so that the yoke 92 may swing directly over the slots 75—79. The upper arms of the yoke 92 carry a pin 95 which projects through an elongated slot 96 in one end of a link 97 disposed between the arms, the opposite end of the link being pivotally connected to the free ends of a pair of ears 98 projecting outwardly and downwardly from the adjacent tapered wall of the tapered section 50 of the curing chamber.

In operation, the curing chamber tilts under a full load and the collar 51 moves towards the yoke 92 and with it the ears 98. The movement of the ears 98 is in an upward curve so that the link 97 moves rearwardly on the pin 95 until the end of the slot 96 strikes the pin 95 and causes the yoke 92 to tilt rearwardly about its pivot 93. During the tilting movement of the yoke the latch 91 is withdrawn from the opening 84 and the valve plate 82 moves rearwardly under the action of the weight 89 to bring the opening 83 into register with the oblong port into the conveyor casing 60.

The valve plate 82 at its outer end is provided with a hand grip 99 by means of which an operator returns the plate to its closed position after the day's run has been completed and the curing chamber has completely discharged its contents and has righted itself.

The speed of the conveyor shaft 62 is governed by the position of the curing chamber which is provided with a mercury switch connection 100 with a two-speed motor 100a, the shaft 101 thereof carrying a sprocket over which a sprocket chain 102 passes to the sprocket wheel 65.

After the bolt 91 has released the valve plate 82, because the curing member has been filled to capacity and has tilted to release the bolt 91, the mercury switch 100 will have switched in the high speed circuit to the motor 100a. The motor 100a drives the conveyor 63 at a speed to carry off the cured cocoa beans at a greater rate than the roasted beans are being fed into the curing chamber. As the level of beans in the curing chamber lowers the latter tilts about its axis and the mercury switch 100 disconnects the high speed circuit and switches in the low speed circuit to the motor 100a. The result is that fewer beans are being conveyed from the chamber and the level rises again.

The roasted material discharged by the curing chamber into the conveyor 63 is carried along the casing 60 until it reaches the port 68 where it drops therethrough and into a chute 103 directed into the lower end of a pneumatic elevator shaft 104.

Elevator

The elevator shaft 104, see Figures 7 and 8, comprises an upright tubular member, the lower or base portion 105 having a window 106 covered with a wire cloth 107 through which air is drawn into the shaft. The chute from the conveyor enters the shaft above the elevation of the window 106.

The material as it flows from the curing chamber into the conveyor and is carried along to the chute and into the elevator shaft retains approximately the same temperature, but upon entering the shaft 104 it begins its cooling process.

The elevator shaft 104 projects in an upright direction to a higher floor of the building housing the roasting plant. At this point an elbow 109 it attached to the elevator which joins a laterally disposed tapered tubular extension 110.

In the preparation of food products from cocoa beans, particularly the steps in the handling of the beans after receiving their heat treatment, are cooling, breaking and winnowing. The useable portion of the cocoa beans is encased in a parchment-like shell which during the roasting process separates itself from the encased kernel, but it is necessary to shatter the shell in order to liberate the usable kernel. It has been found that during the roasting process the kernel of the bean usually separates by cracking into from five to twelve pieces, which are known as "nibs" in the industry, and which are liberated when the shell has been shattered.

Under existing conditions, in order to separate the shell from the nibs, it is necessary to break the beans, including the shell, into a number of pieces. This is brought about by crushing the beans between rollers or rubbing members having corrugated surfaces and in some instances one roller or member is caused to operate at a greater speed than the other. The crushed nibs and shell are then showered through a current of air, the velocity of the latter being sufficient to float the shell away and yet insufficient to carry away the nibs. However, any air moving at sufficient velocity to carry the shell will carry fine particles of nibs as well. As a consequence it is of the greatest importance that the beans be broken in such a manner as to produce the minimum of fine nibs.

In the handling of cocoa beans which have been crushed by pressure applied thereto, the adjacent surfaces of the fragments rub together with the result that the abrasive action causes fine particles to break away from the exposed surfaces. These particles are known as "fines" and are entirely lost in the winnowing process, as now practiced. When beans are broken by this method it is not unusual to lose in the winnowing process, as high as seven and one-half percent of the usable material of the bean.

The present invention contemplates the practice of a method of and special apparatus for minimizing the production of fines in the breaking process to the point where unnecessary loss of valuable material in separating the shell from the nibs is practically nil.

I have conceived the idea that when roasted cocoa beans are projected against a baffle surface with sufficient force, the impact causes the shattering of the beans into nibs, and that as a consequence the abrasion of the fractured surfaces is reduced to a minimum. I have reduced this step to a practical manufacturing process which is accomplished in a machine forming part of the general plant and being illustratively exemplified in Figures 9 and 10 of the drawings.

Breaking chamber

As previously described, the extension of pipe 110 is tapered and disposed laterally and it conducts an air current laden with roasted beans from the elevator 104 to a stage where the breaking process begins or into what is referred to hereinafter as the breaking chamber.

The pipe 110 projects into and towards the opposite end of a tapered rotary or inclined shaker screen 118 above which is provided a baffle plate 119 against which the beans are projected from the pipe 112. The rotary screen 118 may be made up of a series of angle bars 120 disposed longitudinally and slightly outwardly from each other from the smaller end to the larger end. The baffle plate 119 is of steel and is backed by a filler plate 121 and end plate 122, the latter being flanged to receive an annular band 123 to which the ends of the bars 120 are attached. The opposite or larger end of the shaker cylinder is open and supports a ring member 124 to which the outer ends of the bars 120 are attached and which is provided with an external groove or track 125. The large open end of the cylinder 118 is supported for rotary movement on a pair of rollers 126, which have inverted V-shaped peripheral surfaces to ride in the track 125, and which are rotatably carried in bearings 127. The bearings are mounted on a portion of the superstructure 128 forming the support for the entire breaking chamber unit.

The end plate 122 at the smaller end of the cylinder is provided with a central hub 129 carrying a shaft 130 and projecting through an opening in one side of a casing 131 enclosing the entire cylinder. The casing 131 is an upright rectangularly shaped structure having its upper portion projecting considerably above the upper elevation of the rotary screen cylinder. The lower portion of the casing is tapered downwardly and inwardly to form a hopper 132, the bottom of which is provided with a flanged neck 133 to provide an outlet. The mesh or screening material forming the shaker cylinder is of a size which will allow the broken beans dropping from the baffle plate 119 to pass through into the hopper 132, but which will not permit unbroken beans to pass.

The broken beans or nibs in the hopper 132 fall through the outlet 133 into an upright pipe 135 which projects downwardly through the several floors of the plant and opens into nib bin 136 attached to its lower end. The bin 136 is a cylindrical shell having side perforations 137 to admit air and a tapered conical lower end 138 provided with a motor driven continuously operated valve 139 to provide an air seal against entrance of air at its reduced end.

Returning again to the breaking unit, the unbroken beans which are not shattered by striking the baffle flow along the inclined wall of the cylinder 118 and then outwardly over the open end thereof into an outwardly tapered duct 140. The duct 140 opens into the upper section of an inverted cone-shaped chamber 141', which joins a downwardly and inwardly tapered hopper section 141. A stand pipe 142 is connected at its upper end to the opening at the bottom of the hopper section 141 and projects downwardly through the floors of the plant to join the intake port fitting 70 of the conveyor casing 60. A section of the standpipe 142 is provided with an enlarged chamber 143 having a perforated wall to admit air into the pipe. According to this construction the unbroken beans are returned to the conveyor and the blades 64 move them along to the elevator port 68 whence they repeat the cycle and are again projected against the baffle plate 119. This method of breaking minimizes the production of fine nibs and provides the means of recovering the maximum quantity of fines by the flotation process which immediately follows, as hereinafter described.

Cooling process

It will be understood of course that at the end of the heat treating process, the cocoa beans are still in a highly heated condition, in fact the temperature of the beans at this stage may be approximately 275 degrees Fahrenheit. In practice it is necessary to reduce this temperature by approximately 150 degrees before the nibs may be either stored or ground. Common practice is to cool the beans before being broken and while various appliances are used for the purpose, each directs air, having a relatively low temperature through a mass of beans. This cooling process requires a time interval varying between thirty minutes and several hours, depending upon the facilities used.

The present process contemplates a cooling step without interrupting the continuous movement of the beans. The beans at 275 degrees Fahrenheit leaving the conveyor to enter the elevator are immediately subjected to the cooling action of air which enters the window 106 and is drawn into and through the elevator shaft 104 to lift the beans and dash them against the breaking plate. Following the breaking operation the nibs and shells and the unbroken beans are discharged into the stand pipes 132 and 142 which are conduits for an updraft of air admitted through the perforated nib bin 136 and chamber 143. As a consequence, I accomplish the breaking, the cooling and the winnowing in one operation, all stages of which prevent the production of "fines." The lowering of the temperature of the nibs results in part from the residual heat of the beans being rendered latent, by evaporation of their content of imprisoned moisture when the beans are shattered, this evaporation being greatly accelerated by the shattering which greatly increases the surface areas from which evaporation can occur, as well as by the influence of the vacuum in the breaking chamber. My process of cooling cocoa beans simultaneously with the pneumatic transfer, breaking of the same and winnowing of the nibs is highly efficient and almost instantaneous, requiring less than ten seconds.

The air currents set up in the elevator 104 and standpipes 135 and 142 are induced by means of an exhaust fan 144 actuated by a motor unit 145, see Figure 1. The fan may be provided with a discharge pipe 146 leading upwardly through the roof to atmosphere.

A condenser, see Figure 11, is situated closely adjacent the breaking chamber and comprises a cylindrical shell supported upon a superstructure 150 and provided at its lower end with a conical portion 151 having an outflow tube 152 at its lower end to allow the shaft from the system to be discharged.

The branch pipe 154 at its outer end is joined by a section of pipe 156, which is inclined upwardly, and which is connected to an intermediate conduit fitting 157. The conduit fitting 157 opens into branch pipe 158 having an upwardly inclined bottom wall 159, the pipe 158 being joined to the upper portion of the shell or casing 131 of the breaking chamber. The small opening at the head of the bottom wall 159 and side of the branch pipe 158 leads into an exhaust port 160 formed in the head of the casing 131, as illustratively exemplified in Figure 10. The port 160 opens into an annular chamber formed by an annular lateral partition 161 spaced from the top wall of the casing 131. A flap valve 162 is mounted in the port 160 and is manipulated from the exterior of the casing by means of a handle 163 which carries a threaded stub 164 projecting through an arcuate slot 165 in a segmental plate 166 disposed upright adjacent the path of movement of the handle 163 and fixed in position on the casing 131. A nut 167 on the stub 164 may be tightened in any position of the valve and handle to set the position thereof.

I claim:

1. In the process of preparing food products from cacao beans, the herein described steps of continuously moving a continuous mass of the cacao beans through a predetermined path and infusing heat at a predetermined temperature into the moving beans during their transit through the first part of the path and maintaining said beans at a predetermined temperature during transit through the latter part of said path.

2. In the process of roasting raw cocoa beans, the herein described steps of continuously moving a charge of the beans through a helical path and simultaneously infusing heat by convection and at a controlled temperature into the moving beans, thereafter collecting the beans while containing the full quantity of heat infused and holding the beans at the resultant temperature in the beans for a predetermined time interval, passing the beans into suspension in heat exchange relation with a heat absorbing medium at a lower temperature within zones having a pressure below atmospheric pressure, and then shattering the beans during transit through the zone having the lowest pressure.

3. A process of roasting raw cocoa beans as claimed in claim 2, including the further step of showering the fragments of the shattered beans in heat exchange relation with a heat absorbing medium at a lower temperature than that of the fragments.

4. A method of processing raw cocoa beans as claimed in claim 2, including the further steps of showering the fragments of the shattered beans downwardly through and in heat exchange relation with an upwardly moving body of atmosphere of a lower temperature than that of the fragments.

5. A process of roasting raw cocoa beans, as claimed in claim 6, including the further steps of showering the fragments of the beans in heat exchange relation with a heat absorbing medium at a lower temperature than that of the fragments, and finally separating the fragments into the nibs and shells, thereby separating shells from nibs.

6. In a process of roasting cocoa beans, the herein described steps of continuously moving a continuous mass of said beans through a path and infusing heat at a predetermined temperature into the moving mass of beans by induction and radiation during their transit through a first part of said path, and preventing loss of heat from said mass of beans during their transit through a second part of said path.

7. The process of roasting cocoa beans, which consists in causing said beans to traverse a predetermined path in heat exchange relation to a source of heat and at their exit from said path confining said beans against the loss of heat.

8. The process of roasting cocoa beans, which consists in causing a mass of said beans to continuously flow through a predetermined path in heat exchange relation to a source of heat maintained at a predetermined temperature and upon leaving said path confining the mass of beans against the loss of heat for a predetermined time interval.

9. The process of roasting cocoa beans, which consists in causing a mass of said beans to flow through a predetermined time interval in heat exchange relation to a source of heat, maintained at a predetermined temperature and at the end of said time interval confining the flowing mass against the loss of heat for a predetermined time interval.

10. The process of roasting cocoa beans, which consists in causing a continuous mass of said beans to continuously move through a predetermined path at a uniform rate and infusing heat into said mass at a predetermined rate during a predetermined time interval and at the end thereof confining said beans with their residual heat for a predetermined time interval.

11. The process of roasting cocoa beans, which consists in causing a continuous mass of said beans to continuously flow through a predetermined path and, in a first part of said path infusing heat into said mass under conditions to establish therein a predetermined temperature, and throughout a second part of said path retaining the residual heat in said mass to maintain said predetermined temperature therein.

12. The process of roasting cocoa beans which consists in causing a continuous mass of said beans to continuously flow through a predetermined path and, in a first part of said path infusing heat into said mass under conditions to establish therein a predetermined temperature, and throughout a second part of said path retaining the residual heat in said mass to maintain said predetermined temperature therein, and predetermining the rate of flow in each part of said path.

13. The process of roasting cocoa beans, which consists in causing a continuous mass of said beans to continuously flow at a predetermined rate through a predetermined path, and infusing heat into said mass at a predetermined rate during its transit through a first part of said path, to establish in said mass a predetermined final temperature, and retaining the full quota of infused heat residual in the mass, to maintain said final temperature therein, during its transit through a second part of said path.

14. The continuous method of conditioning raw cocoa beans for grinding into liquor by stone mills, which consists in continuously feeding a mass of raw beans into a confined path and flowing the mass through a first part of said path in heat exchange relation to a predetermined source of heat adjusted to raise the temperature of the beans to a predetermined degree during their transit through said first part of the path, continuing the movement of said beans through a second part of said path under predetermined conditions adjusted to maintain said temperature in the beans, continuing the movement of the mass through a third part of said path in which pressure less than that of atmosphere is maintained and shattering the beans in said third part of the path, in a fourth part of said path winnowing the shell from the nibs by gravitating the fragments of the shattered beans downwardly through an upwardly moving body of air and continuously discharging the nibs from said path properly roasted, cooled, dryed and cleaned of shell.

THOMAS J. STEPHENS.